(12) United States Patent
Hui et al.

(10) Patent No.: US 9,797,524 B2
(45) Date of Patent: Oct. 24, 2017

(54) MICROFLUIDIC LOGIC CIRCUIT

(71) Applicant: The Regents of the University of California, Oakland, CA (US)

(72) Inventors: Elliot En-Yu Hui, Irvine, CA (US); Siavash Ahrar, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 33 days.

(21) Appl. No.: 14/852,286

(22) Filed: Sep. 11, 2015

(65) Prior Publication Data

US 2016/0208833 A1    Jul. 21, 2016

Related U.S. Application Data

(60) Provisional application No. 62/049,787, filed on Sep. 12, 2014.

(51) Int. Cl.
*G06K 19/00* (2006.01)
*F16K 99/00* (2006.01)

(52) U.S. Cl.
CPC ...... *F16K 99/0001* (2013.01); *F16K 99/0015* (2013.01); *F16K 99/0057* (2013.01); *F16K 2099/0094* (2013.01)

(58) Field of Classification Search
CPC ........ Y10T 137/0318; Y10T 137/0396; G06Q 10/08
USPC ...... 137/1, 14, 487.5, 557; 303/15, 3, 118.1; 73/37, 61.56; 141/94; 235/487, 493
See application file for complete search history.

(56) References Cited

U.S. PATENT DOCUMENTS

| | | | | |
|---|---|---|---|---|
| 3,752,036 A | * | 8/1973 | Hicks | G05B 19/44 409/80 |
| 3,771,569 A | * | 11/1973 | Boros | F15B 21/00 137/816 |
| 4,953,578 A | * | 9/1990 | Kautz | F24F 11/02 137/14 |
| 7,445,926 B2 | | 11/2008 | Mathies et al. | |

(Continued)

OTHER PUBLICATIONS

Ahrar, S., Hwang, et al., "Microfluidic serial dilution ladder," Analyst 139, pp. 187-190 (2013).

(Continued)

*Primary Examiner* — Jamara Franklin
(74) *Attorney, Agent, or Firm* — Nguyen & Tarbet Patent Law Firm

(57) ABSTRACT

Pneumatic devices for implementing finite state machines are provided. In some implementations, the pneumatic device comprises a state register component configured to hold one of a set of possible states. The pneumatic device also comprises a next-state logic block component configured to determine a next state for the state register component based at least in part on a current state of the state register component. A pneumatic programmable logic array (PLA) implementing a next state logic block of a finite state machine is also provided. The pneumatic PLA comprises an elastomeric membrane containing a pattern of holes and disposed between two channel layers of a pneumatic device. The PLA receives one or more input values representing a current state of a state register and one or more input values representing a user input and calculates one or more output values representing a next state for the state register.

19 Claims, 14 Drawing Sheets

(56) References Cited

U.S. PATENT DOCUMENTS

| | | |
|---|---|---|
| 7,766,033 B2 | 8/2010 | Mathies et al. |
| 2007/0237686 A1 | 10/2007 | Mathies et al. |
| 2013/0255799 A1 | 10/2013 | Devaraju et al. |
| 2014/0079571 A1 | 3/2014 | Hui et al. |

OTHER PUBLICATIONS

Duncan, P. N., et al., "Scaling of pneumatic digital logic circuits," Lab Chip 15, pp. 1360-1365 (2015).
Rhee, M., et al., "Microfluidic pneumatic logic circuits and digital pneumatic microprocessors for integrated microfluidic systems," Lab Chip 9, pp. 3131-3143 (2009).
Weaver, J. A., et al. "Static control logic for microfluidic devices using pressure-gain valves," Nat Phys 6, pp. 218-223 (2010).

* cited by examiner

MICROFLUIDIC LOGIC CIRCUIT

CROSS REFERENCE TO RELATED APPLICATIONS

This application claims priority to and commonly assigned U.S. Provisional Patent Application No. 62/049,787, filed on Sep. 12, 2014, entitled "Programmable Pneumatic Microfluidic Logic Circuit," by Hui et al., which is incorporated herein by reference in its entirety for all purposes.

STATEMENT REGARDING FEDERALLY SPONSORED RESEARCH

This invention was made with Government support under National Science Foundation grant ECCS-1102397, and Defense Advanced Research Projects Agency grant N66001-1-4003. The Government has certain rights in this invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Various implementations relate to microfluidic devices. The integration of laboratory operations on a microfluidic device has numerous applications in medical diagnostics and biological science. Research into microfluidic devices, which perform various functions for biochemical reactions using biochemical fluids, such as blood, urine, saliva and sputum, for example, and detect the results thereof, has been actively pursued. Microfluidic devices may be of a chip type such as a lab-on-a-chip or of disk type such as a lab-on-a-disk. The lab-on-a-chip and lab-on-a-disk have received much attention in chemical and biotechnology fields since such devices may increase reaction rates, be automated, be made portable, and use a small amount of reagent. A microfluidic device typically includes a microchannel, through which a fluid flows, and a microvalve, which controls the flow of fluid in the microchannel. In a microfluidic device, the microvalve or microvalves control the transfer, mixing, accurate metering, biochemical reaction, isolation and detection of a sample in the microfluidic device of a chip type such as a lab-on-a-chip.

A variety of liquid handling operations can be performed using microfluidics technology, thus allowing complex laboratory assays to be automated on a compact chip. Integrated microfluidics is a technology that allows valves and pumps to be built right on the microfluidics chip, thus allowing complex liquid handling and a high degree of multiplexing. In order to execute the required liquid handling operations, the valves and pumps on the chip must be activated at the proper time. Typically, this is achieved by computer controlled pneumatic actuators that sit outside of the chip itself and are connected to the chip through a network of tubing. While this has worked well in engineering laboratories, the considerable amount of off-chip machinery is too cumbersome and complex for general use. The need for off-chip controls introduces significant disadvantages in terms of size, cost, ease of use, and reliability. The implementation of digital logic circuits out of microfluidic valves and channels could potentially enable fully self-contained systems that are controlled by onboard circuitry, thus eliminating the need for off-chip controls. Such systems could include autonomous control circuits that can execute a programmed set of operations without off-chip control.

SUMMARY

In one aspect, some implementations feature a pneumatic device implementing a finite state machine. The pneumatic device comprises a state register component that is configured to hold one of a set of possible states. The pneumatic device further comprises a next-state logic block component configured to determine a next state for the state register component based at least in part on a current state of the state register component.

Various implementations may include one or more of the following features. The pneumatic device includes a pneumatic switch that is configured to receive a user input. The next state for the state register component is based at least in part on the user input.

The pneumatic device is composed of an elastomeric membrane disposed between two channel layers, wherein the next-state logic block component comprises a pneumatic programmable logic array (PLA) comprising a pattern of holes disposed in the elastomeric membrane of the pneumatic device. The pattern of holes implements a set of Boolean expressions, the set of Boolean expressions determining one or more state transitions of the finite state machine.

The pneumatic device further comprises a plurality of fluid valves configured to perform fluid handling operations. Each fluid handling operation may correspond to a state of the finite state machine. The fluid handling operations may include one or more of metering, mixing, agitating, exchanging, and recirculating fluids on the pneumatic device. The finite state machine may also be configured to actuate the plurality of fluid valves configured to perform serial dilution of a liquid.

The pneumatic device comprises a visual display comprising a bank of valves configured to open and close to show the current state of the state register component.

The pneumatic device further comprises a system clock oscillating between binary 1 and 0 at a set frequency, wherein binary 1 is represented by vacuum pressure and binary 0 is represented by atmospheric pressure.

The state register of the pneumatic device comprises one or more pneumatic D flip-flop circuits. Each pneumatic D flip-flop circuit comprises two cascaded D latches gated by a system clock of the pneumatic device.

In another aspect, the described implementations feature a pneumatic PLA implementing a next state logic block of a finite state machine. The pneumatic PLA comprises an elastomeric membrane disposed between two channel layers of a pneumatic device. The elastomeric membrane includes a pattern of holes disposed in the elastomeric membrane. In some implementations, the PLA receives one or more input values representing a current state of a state register and an input value representing a user input. The PLA calculates one or more output values representing a next state for the state register.

Various implementations may include one or more of the following features. The pattern of holes implements a set of Boolean expressions, the set of Boolean expressions determining one or more state transitions for a programmable finite state machine. Each hole disposed in the elastomeric membrane is configured to form a circuit connection between the two channel layers of the pneumatic device.

The current state of the state register corresponds to a first fluid handling operation performed by the pneumatic device. The next state of the state register corresponds to a second fluid handling operation performed by the pneumatic device.

In yet another aspect, the described implementations feature a pneumatic device implementing a programmable microcontroller directing serial dilution of a liquid. The pneumatic device comprises a state register component configured to hold one of a set of possible states. The pneumatic device further comprises a next-state logic block component configured to determine a next state for the state register component based at least in part on a current state of the state register component. The pneumatic device further comprises a plurality of loops arranged in a ladder formation, each loop configured to contain liquid for mixing. The pneumatic device further comprises a decoder component configured to identify, based on the current state of the state register component, one of the plurality of loops for mixing.

Various implementations may include one or more of the following features. The pneumatic device further comprises an oscillator pump component configured to generate an oscillatory signal configured to cause peristaltic pumping action and circulatory mixing of contents of the loop identified by the decoder component. The oscillator pump component comprises five inverter logic gates implemented by pneumatic valves, the logic gates being connected in a closed loop. The pneumatic device is configured to store each stage of dilution for subsequent dilution.

Implementations can include one or more of the following advantages. Laboratory operations on a microfluidic device may be controlled by integrated circuitry located directly on the microfluidic device that can execute a programmed set of operations without off-chip control. This eliminates the need for off-chip controls that may be too cumbersome and complex for general use. On-chip controls provide advantages in terms of size, cost, ease of use, and reliability. Various implementations facilitate programmable execution of on-chip control of fluid systems for precise metering, dilution, and reaction of multiple reagents. The described implementations take a step toward complete elimination of off-chip control elements, such as valve manifolds, and paves the way for a fully self-contained lab-on-a-chip without dependence on electricity.

These and other features and advantages will be presented in more detail in the following specification and the accompanying figures, which illustrate by way of example the principles of the described implementations.

BRIEF DESCRIPTION OF THE DRAWINGS

The described implementations may best be understood by reference to the following description taken in conjunction with the accompanying drawings that illustrate specific implementations.

DETAILED DESCRIPTION

Reference will now be made in detail to some specific implementations including the best modes contemplated by the inventor. Examples of these specific embodiments are illustrated in the accompanying drawings. While the described implementations are described in conjunction with these specific embodiments, it will be understood that it is not intended to be limiting. On the contrary, it is intended to cover alternatives, modifications, and equivalents as may be included within the spirit and scope of the described implementations as defined by the appended claims. For example, the techniques of the described implementations will be described in the context of glass microfluidic devices, although other embodiments such as plastic or polymer devices could also be used.

It should be noted that the fluid control structures suitable for use in microfluidic devices can be applied to a variety of microfluidic devices. A pathogen detection system is a good example of one possible application that can benefit from the use of fluid control structures. Also, it should be noted that a fluid is considered to be an aggregate of matter in which the molecules are able to flow past each other, such as a liquid, gas or combination thereof, without limit and without fracture planes forming. Moreover, while references may primarily be made to pneumatic implementations, it should be noted that the described implementations may be implemented using a hydraulic microfluidic circuit. In the following description, numerous specific details are set forth in order to provide a thorough understanding of the described implementations. The described implementations may be practiced without some or all of these specific details. In other instances, well known operations have not been described in detail in order not to unnecessarily obscure the described implementations.

Furthermore, techniques and mechanisms of the described implementations will sometimes be described in singular form for clarity. However, it should be noted that some embodiments can include multiple iterations of a technique or multiple instantiations of a mechanism unless noted otherwise.

Various implementations include a pneumatic device implementing a finite state machine (FSM). The pneumatic device comprises a state register component and a next-state logic block component configured to determine the next state for the state register component. The next-state logic block component may be implemented with a PLA that allows for configuration of the finite state machine. Various implementations may also utilize a pneumatic switch integrated directly on the pneumatic device so that the FSM may accept user input and respond to it accordingly.

Figure 1A:
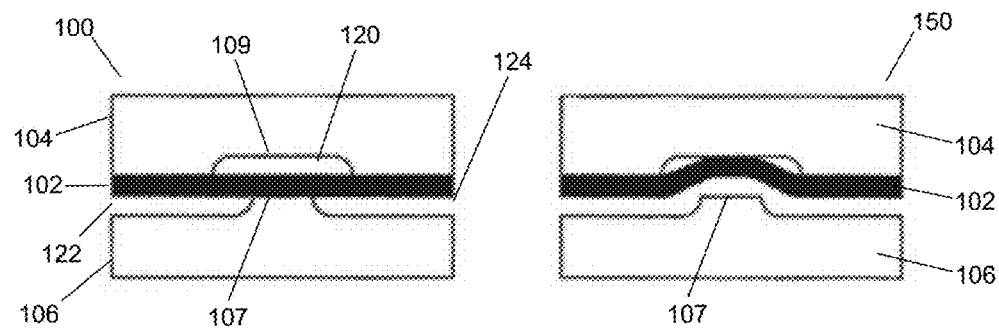
FIGS. 1A and 1B are diagrammatic views of a pneumatic membrane valve.
Figure 1B:
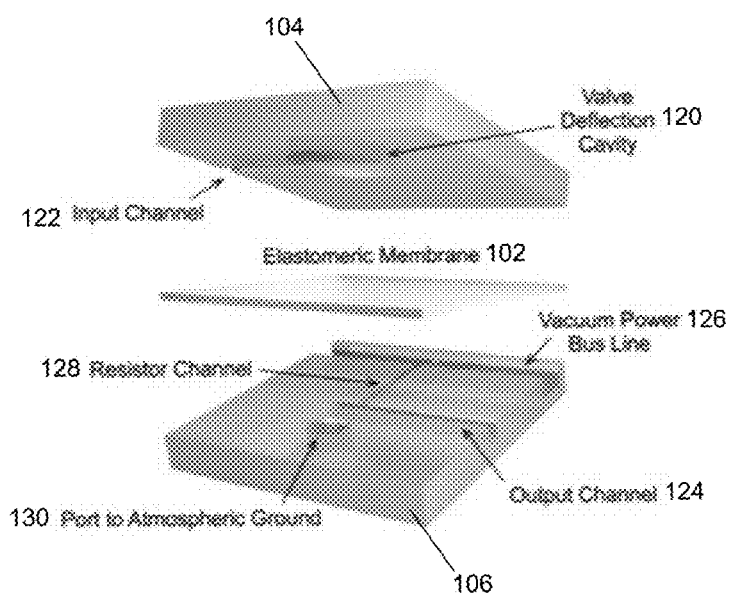

FIGS. 1A and 1B are diagrammatic views of a pneumatic membrane valve 100. As shown, a polydimethylsiloxane (PDMS) membrane 102 is sandwiched between two wafers or substrates 104 and 106. When a vacuum is applied to a control channel, the membrane 102 is pulled from its valve seat 107 into a displacement chamber 120 to abut against a wall 109 of the displacement chamber. FIG. 1A shows an example of a membrane valve in default position 100 and a membrane valve in deformed position 150 when a vacuum is applied to the control channel. In some implementations, the valve seat 107 and the two substrates 104 and 106 are made of glass. As such, a change in pressure at the input channel 122 may trigger a change in pressure at the output channel 124. The nature of the glass-PDMS bond makes the valve effective for controlling on-chip flows of both gas and liquid. Details regarding the structure and construction of an example of a pneumatic membrane valve 100 are disclosed in U.S. Pat. No. 7,445,926, filed Dec. 29, 2003, entitled "Fluid Control Structures in Microfluidic Devices", which is incorporated herein by reference.

A pneumatic inverter logic gate may utilize such a pneumatic membrane valve that is closed at rest and opened by applying vacuum to the gate input. FIG. 1B provides an exploded view of a pneumatic inverter gate. The pneumatic inverter gate includes a first wafer 104 that contains an input channel 122 and a valve deflection cavity 120 and a second wafer 106 that includes an output channel 124, a vacuum power bus line 126, a resistor channel 128, and a port to atmospheric ground 130. Vacuum input deflects the elastomeric membrane 102 to connect output to ground. With the valve closed under atmospheric input, the gate outputs vacuum pressure.

Figure 1C:
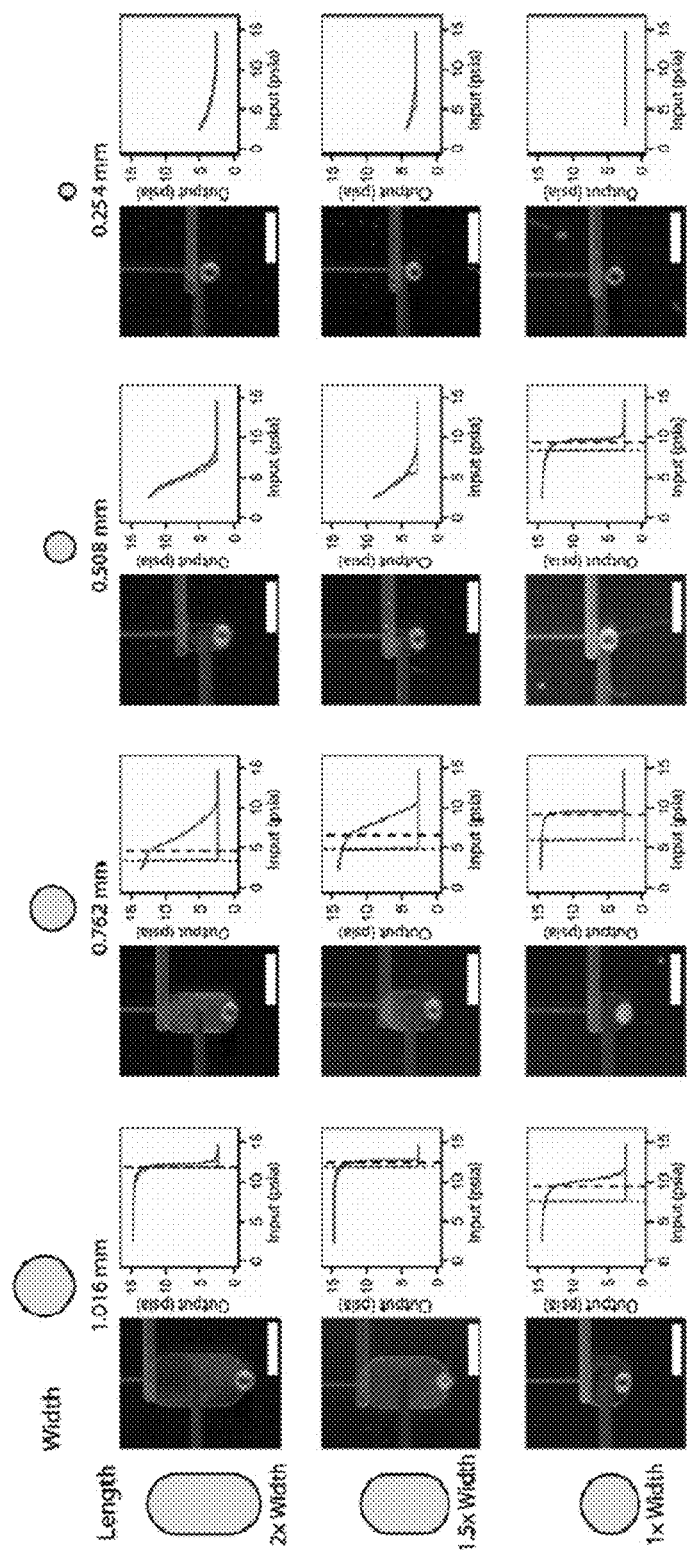
FIG. 1C is a graphical representation of transfer function characteristics for various pneumatic inverter gate designs.

FIG. 1C is a graphical representation of transfer function characteristics for various pneumatic inverter gate designs as the size and shape of the valve deflection cavity are varied. In some implementations, the circular valve design may maximize the high and low noise margins. Typically, higher noise margins are desirable, contributing to greater robustness. The graphs of FIG. 1C indicate that the round shape with 0.762 mm diameter may be more optimal than the other represented valve designs.

In some implementations, a computer numerical control (CNC) plastic milling process may be utilized to precisely bore ports for the pneumatic device. This allows the ports to atmospheric ground to be placed directly underneath a valve, contributing to minimizing the total footprint of the pneumatic valves on the device. The boring of via holes may be performed by laser cutting, allowing small holes to be formed and placed accurately. Also, the use of alignment pins may also assist in the accurate alignment of vias and channels. These techniques may result in a significant reduction in the area consumed by the via ports.

All together, these scaling strategies may result in an order-of-magnitude improvement in circuit density. For example, a T flip-flop circuit may be reduced from a die area of 420 mm$^2$ to 22 mm$^2$ using the described implementations. An advantage of higher density circuits is that they allow more complex designs to be realized.

For example, T flip-flops may be cascaded to form asynchronous counter circuits, with each bit of the counter requiring a single T flip-flop. In a first-generation process, a 6-bit counter requires 2100 mm$^2$ of die area, approaching the practical limit for total device area. In the described implementations, it is possible to build a fully functional 12-bit counter in an area of only 360 mm$^2$. Since the plastic process of the described implementations offers low-resistance bus lines, this 12-bit counter requires only a single vacuum connection to supply power to 108 gates. In contrast, the first-generation glass 6-bit counter requires 12 separate power connections, with two connections required for each T flip-flop. Achieving a 12-bit counter is significant, as the circuit may be coupled with a 1 Hz clock to provide timing control for an hour-long process with a resolution of 1 second.

In microelectronics, transistor scaling typically has brought an increase in switching speed due to the decrease in gate capacitance for smaller transistors. Though the relationship is not exact, volume in pneumatic circuits is fairly analogous to capacitance in electrical circuits. Thus, the decrease in circuit volume that occurs as die area is reduced should be expected to produce an increase in speed. For instance, shrinking a 13-stage ring oscillator may increase its oscillation frequency from 2.6 Hz to 22.1 Hz. Likewise, a first-generation glass 6-bit counter could be operated at a maximum clock frequency of ⅓ Hz, while a second-generation plastic 12-bit counter could be operated at up to 3 Hz, and a 8-bit counter could be operated at up to 6 Hz.

Figure 2A:
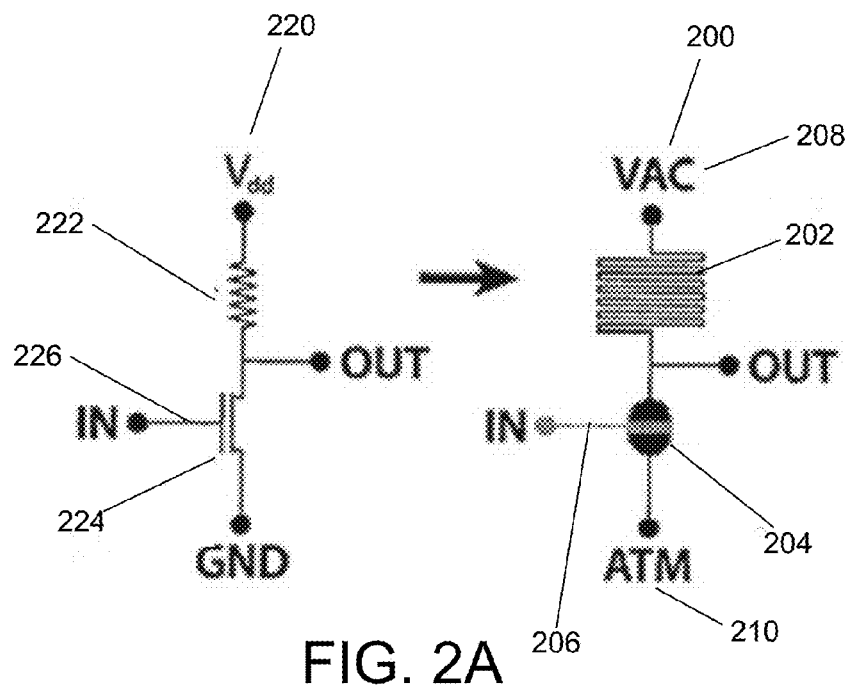
FIG. 2A is a diagrammatic representation of a pneumatic inverter logic gate and an electronic inverter logic gate using an n-channel field effect transistor.

FIG. 2A is a diagrammatic representation of a pneumatic inverter logic gate 200 and an electronic inverter logic gate 220 using an n-channel field effect transistor 224. The pneumatic inverter logic gate 200 can be thought of analogously to the electronic gate 220. Pneumatic logic gates and circuits can be constructed by mimicking the n-channel MOSFET (NMOS) logic family of electronics, with transistors 224 replaced by valves 204, wires 226 replaced by channels 206, and electronic pull-up resistors 222 replaced by long, narrow microfluidic channel pull-up resistors 202, wherein the pull-up resistance of the pull-up resistors 202 varies as a function of the length of the long, narrow microfluidic channels comprising the pull-up resistors 202. Instead of being powered by a voltage differential as in electronics, these circuits are powered by a pressure differential. A vacuum line may provide supply vacuum (VAC) pressure 208 to the microfluidic chip. In some implementations, the oscillation frequency of the oscillator circuit may vary as a function of the supply vacuum pressure 208. VAC may be defined to be the supply and atmospheric (ATM) pressure 210 to be the ground, wherein VAC represents binary 1, and ATM represents binary 0. This maintains the analogy to NMOS logic, since the membrane valves open with an input of 1. All of the fundamental Boolean operations are possible in this technology. In the case of a binary inverter, an input (IN) of 1 opens the valve 204 and pulls down the output (OUT) to 0, whereas an input (IN) of 0 closes the valve, allowing current through the pull-up resistor 202 to bring the output (OUT) to 1.

Vacuum-driven pneumatic logic gates exhibit high non-linear gain, which is critical for noise suppression in digital systems and allows for fan-out and cascading. It is likely that gain occurs because the adhesion of the membrane to the valve seat dominates over the mechanical elasticity of the membrane, thus causing the valve to remain fully closed below a threshold pressure and to snap fully open quickly once that threshold is exceeded and adhesion is broken, as shown in FIG. 1C. Importantly, this intrinsic non-linear gain is not present in pressure-driven pneumatic and hydraulic approaches. Instead, additional engineering has been required in order to achieve gain in these other logic technologies. Additionally, pneumatic logic is advantageous over hydraulic logic due to the two orders-of-magnitude difference in viscosity between water and air, resulting in a significant inherent speed advantage for pneumatics.

Figure 2B:
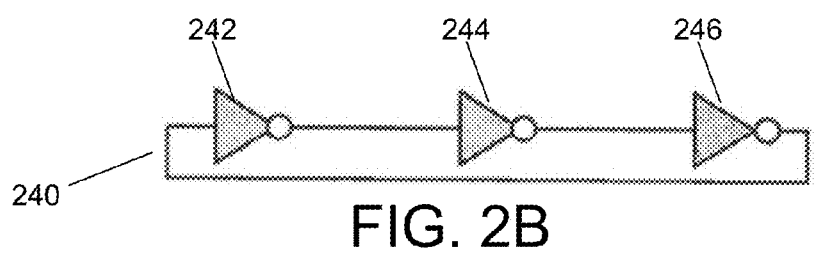
FIGS. 2B and 2C are diagrammatic representations of a 3-inverter oscillator circuit.
Figure 2C:
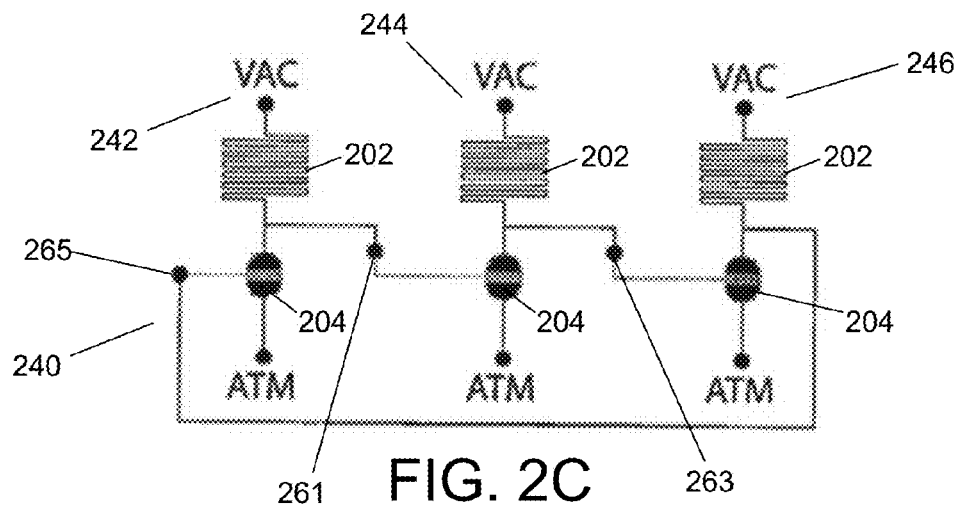

FIGS. 2B and 2C are diagrammatic representations of a 3-inverter oscillator circuit 240. FIG. 2B provides a schematic representation of the three pneumatic inverter logic gates 242, 244, and 246 in a closed loop, and FIG. 2C provides an exploded diagrammatic representation of the three-inverter oscillator circuit 240, with details regarding the logic gate components that are included in the inverter logic gates 242, 244, and 246. Nodes 261, 263, and 265 are located between the logic gates 242, 244, and 246. As noted in FIG. 2C, each logic gate includes a pneumatic valve 204, a pull-up resistor 202, an input, an output, and connections to VAC and ATM. Due to the delay provided by each of the inverter logic gates, the binary values at the nodes oscillate in a coordinated manner and at an oscillation frequency, and the resulting oscillation provides a frequency reference for operations on a microfluidic chip. In some implementations, the oscillation frequency of the circuit is between approximately 2.0 Hz and 5.0 Hz. In other implementations, the oscillation frequency may be less or greater than that specified range. While FIGS. 2B and 2C depict a 3-inverter oscillator circuit, it should be noted that any odd number of inverter logic gates may be used to implement an oscillator circuit.

Frequency references are fundamental to most digital systems, providing the basis for process synchronization, timing of outputs, and waveform synthesis. Various implementations may include pneumatic oscillator circuits built from microfluidic valves and channels. Pneumatic circuits are best described by compressible-flow analysis that differs fundamentally from conventional circuit theory. Various implementations also provide for optimization of oscillator stability and demonstration of more complex circuits for the generation of phase-shifted waveforms and optimized peristaltic pumping. Thus, pneumatic oscillators can serve as on-chip frequency references for microfluidic digital logic circuits, providing a critical component towards achieving fully integrated microfluidic systems. In some implementations, the oscillator circuits depicted in FIGS. 2B and 2C may be used to generate an oscillating control signal for timing and synchronization of various actions to be performed on a microfluidic device. Peristaltic pumping of fluids in a microfluidic device, further described below, is just one example of how the oscillator circuits of FIGS. 2B and 2C may be used for timing and synchronization purposes.

The complexity of microfluidic systems has exploded over the past decade, achieving highly multiplexed, automated operations by integrating up to thousands of pumps and valves onto a single chip. Typically in microfluidic large-scale integration, valves are actuated by an off-chip pneumatic source gated by mechanical solenoid valves under computer control. This modular and intuitive approach has seen great success. However, the complexity of the off-chip components and connections are detrimental to cost and reliability, posing a barrier to widespread adoption. Next-generation microfluidic systems are envisioned to contain embedded controls, enabling self-contained devices that can autonomously execute a set of preprogrammed microfluidic circuits themselves, thus eliminating the need for machinery to interface between the electrical and fluidic realms. Fundamental building blocks, such as Boolean logic gates, memory latches, and frequency-sensitive valves, as well as more complex systems such as shift registers and adders, have been implemented employing elastomeric valves as transistor analogues. Digital logic operations have also been employed by using microfluidic droplets to represent binary information.

Figure 3:
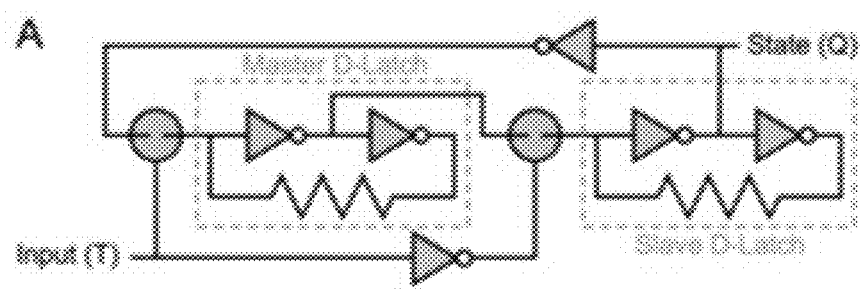
FIG. 3 is a diagrammatic representation of a T flip-flop circuit.

FIG. 3 is a diagrammatic representation of a T flip-flop circuit. The circuit is achieved by cascading two D latches and feeding back the inverse of the second latch state into the input of the first latch. Signal transfer between the latches is gated by an input signal. One or more T flip-flops may be cascaded to form an asynchronous binary counter. Each bit of the counter may be implemented by an individual T flip-flop. The asynchronous binary counter may implement a finite state machine that traverses the states sequentially following a fixed pattern that cannot be changed.

The D latch may be implemented as two pneumatic inverter logic gates in series, with the output of the second inverter fed back through a resistor into the input of the first inverter. This defines a bistable circuit that can hold a binary 1 or 0. Two D latches may be cascaded to form a D flip-flop circuit. The inputs of the latches are gated by a system clock oscillating between binary 1 and 0 at a set frequency such that input to the D flip-flop is written to the first D latch on the rising clock edge, and this bit is transferred to the second D latch on the falling clock edge. For the system clock, binary 1 may be represented by vacuum pressure and binary 0 may be represented by atmospheric pressure.

Figure 4A:
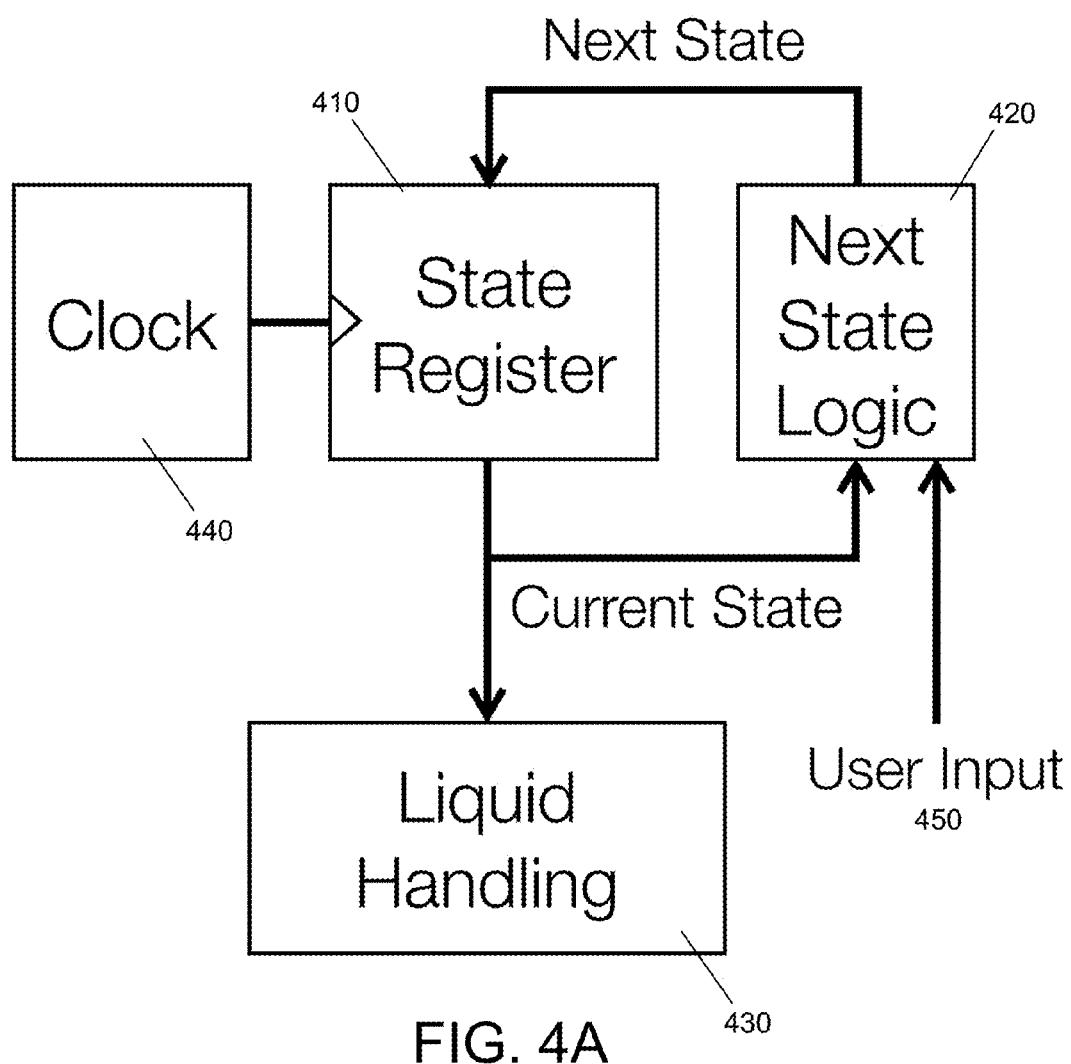
FIG. 4A is a diagrammatic representation of a finite state machine.

FIG. 4A is a diagrammatic representation of a finite state machine. A finite state machine is a model of computation, in which at any given point in time, the abstract machine is in exactly one state out of a finite set of possible states. It can change to another state according to the rules of a set of defined transitions. In some described implementations, the current state of the machine is held in the state register, which is a bank of one or more pneumatic D flip-flops. For example, a 2-bit FSM requires two D flip-flops and has 4 possible states.

In various implementations, the state register 410 stores the current state of the finite state machine. The next state logic block 420 determines the next state of the state register based on the current state of the state register. In some implementations, the next state logic block 420 may also take into account a user input 450 to determine the next state of the state register 410. The current state of the state register 410 determines a particular liquid handling 430 operation to be performed by the pneumatic device. Each state thus triggers specific pump and valve actuation in an integrated liquid handling circuit to meter, mix, agitate, or recirculate fluids on the device.

In some implementations, the next state logic block is implemented as a PLA. A PLA can be configured to represent a wide variety of different Boolean expressions. By using a PLA to implement the next state logic block, the described implementations may achieve a programmable FSM. In one implementation, the PLA calculates 2 output values from 6 inputs. The inputs are grouped into complementary pairs, and so this is equivalent to 3 Boolean inputs: two inputs for the current state and one input from the user. In some implementations, the PLA has 4 gates in the AND plane, and 2 gates in the OR plane. This is implemented as an equivalent circuit of 4 NAND gates feeding into 2 NAND gates.

Figure 4B:
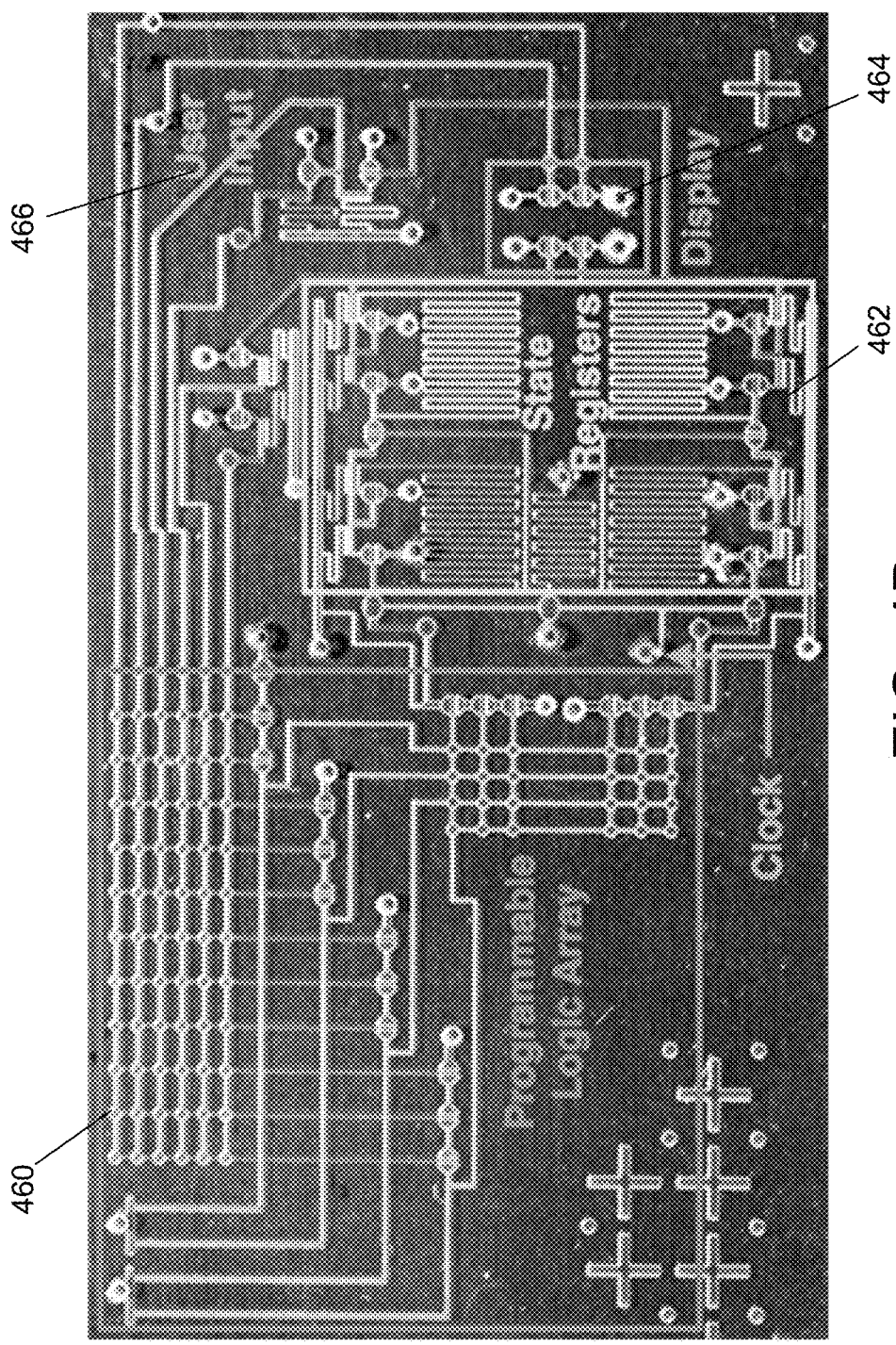
FIG. 4B is a diagrammatic representation of a finite state machine implementation in microfluidic digital logic.

FIG. 4B is a diagrammatic representation of a FSM implementation in microfluidic digital logic. The next state logic block is implemented as a PLA 460, which enables the transition rules of the FSM to be reconfigured as required. The PLA 460 and the user input 466 determine the next state for the state registers 462. The current state of the state registers may be visualized using the display 464. The display 464 may include a bank of valves that open and close to show the current state of the FSM.

Figure 5A:
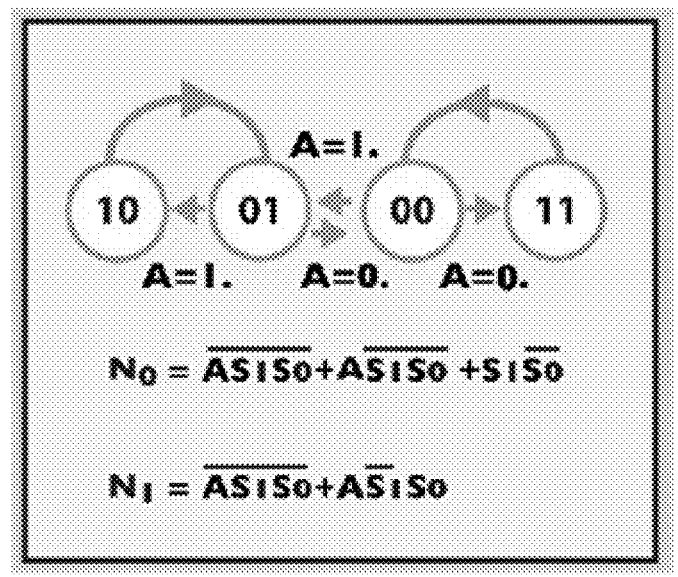
FIG. 5A is a diagrammatic representation of a state transition diagram for a finite state machine.

FIG. 5A is a diagrammatic representation of a state transition diagram for a finite state machine. It includes the 4 states of the FSM (10, 01, 00, 11) and the transitions between the states. The state transitions are also determined based on a user input, represented by A. Based on the state transition diagram, the excitation equations $N_0$ and $N_1$ are calculated.

Figure 5B:
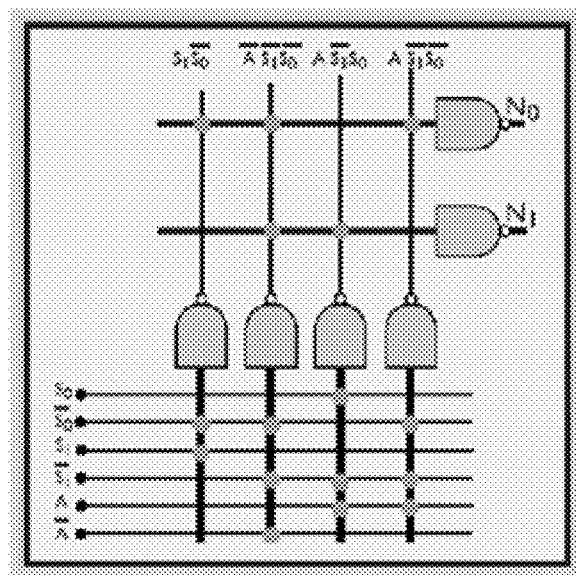
FIG. 5B is a diagrammatic representation of a gate level diagram for the PLA of the finite state machine.

FIG. 5B is a diagrammatic representation of a gate level diagram for the PLA of the finite state machine. Based on the excitation equations, the connections among the NAND gates are mapped onto the gate level diagram. The dots are the connections, bringing nodes of the circuits together. The gate level mapping is then translated into the actual pneumatic circuit.

Figure 5C:
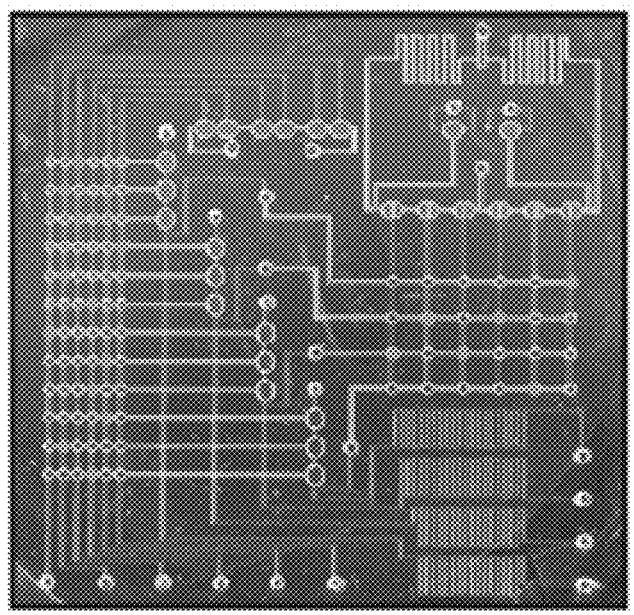
FIG. 5C is a diagrammatic representation of a PLA circuit.

FIG. 5C is a diagrammatic representation of a PLA circuit. In the actual PLA circuit, the elastomeric membrane is bored to bring two channels on different layers of the circuit together.

Figure 5D:
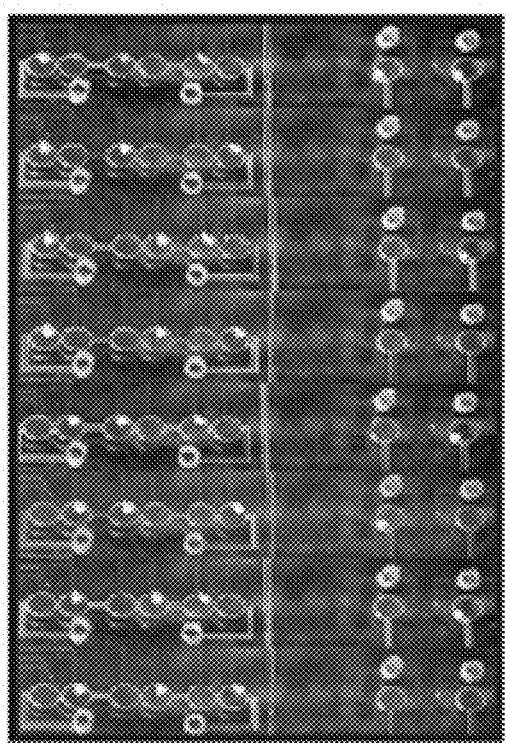
FIG. 5D is a diagrammatic representation of a visual truth table.

FIG. 5D is a diagrammatic representation of a visual truth table, in which the eight acceptable states of the finite state machine, taking into account the user input, may be verified.

Figure 5E:
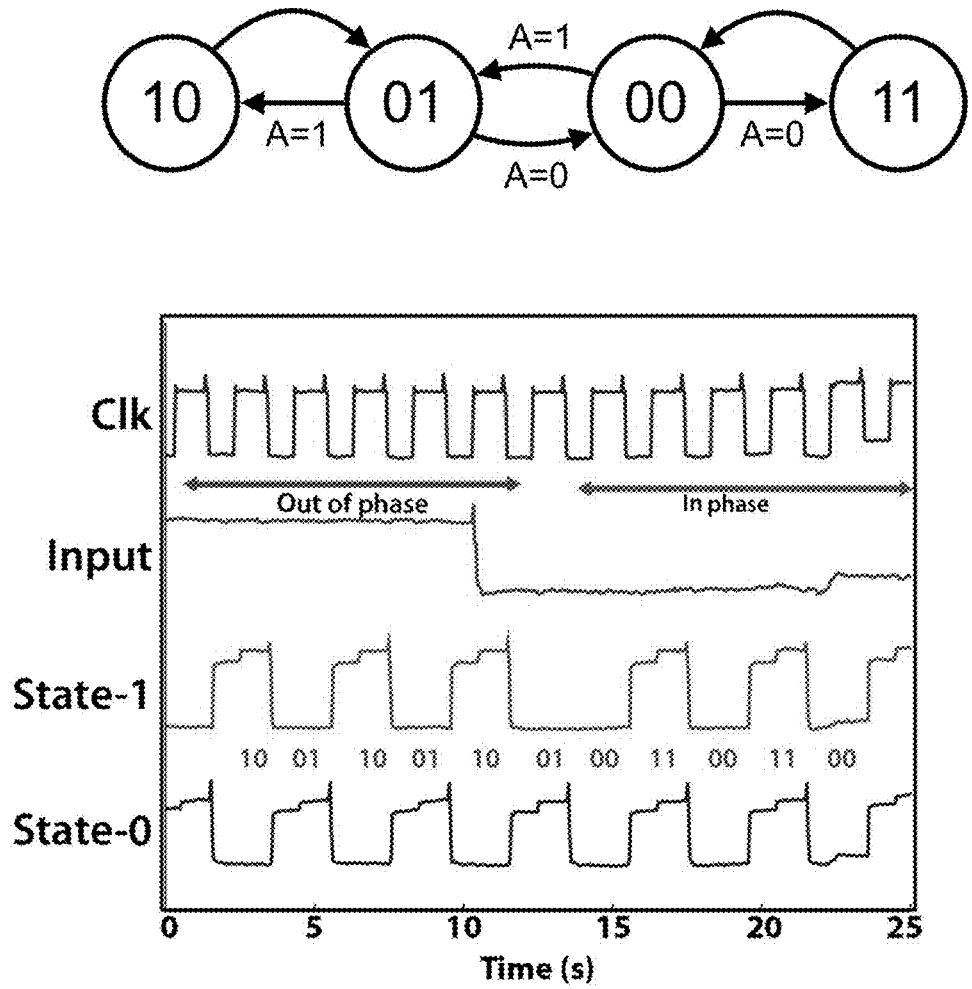
FIG. 5E is a graphical representation of a time trace graph from the circuit of FIGS. 5A-5D.

FIG. 5E is a graphical representation of a time trace graph from the circuit of FIGS. 5A-5D. The time trace is calculated using video analysis and measuring valves opening and closing. The time trace confirms the branching decision making ability of the PLA FSM.

As shown in FIGS. 5A-5E, in order to encode an FSM, the state transition diagram is converted to a set of reduced sum of products Boolean expressions. These logic expressions are wired into the PLA circuit by drilling a pattern of holes in the membrane layer to form circuit connections between the two channel layers of the device. In the standalone PLA, correct programming of the Boolean expressions can be verified by cycling through all of the possible inputs and observing the output values in order to construct a truth table. Once verified in the standalone PLA, the pattern of holes can be transferred to the integrated PLA in the FSM.

Figure 6A:
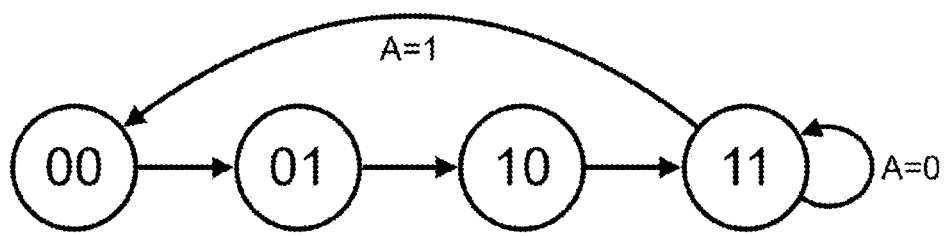
FIG. 6A is a diagrammatic representation of a state transition diagram for a finite state machine.
Figure 6B:
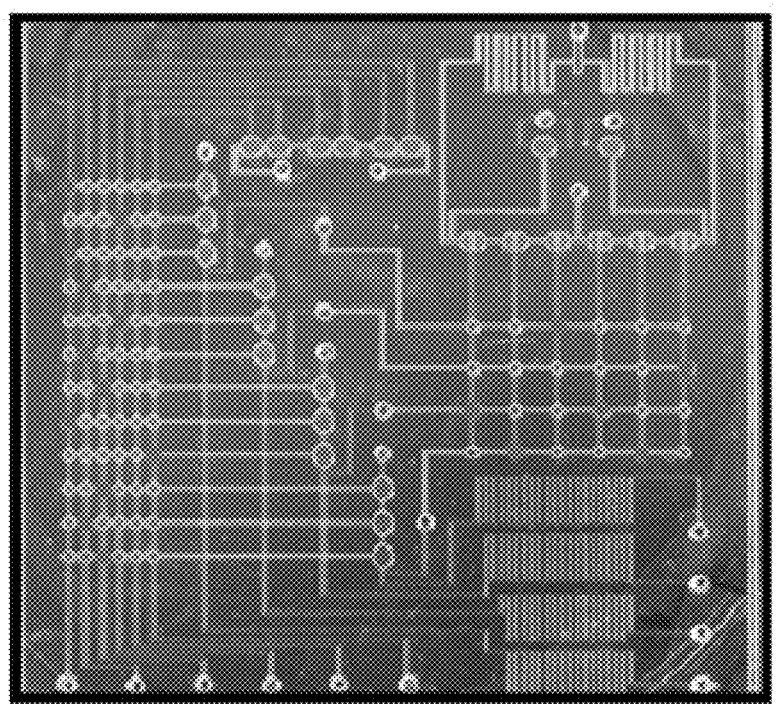
FIG. 6B is a diagrammatic representation of a PLA circuit implementing the state transition diagram of FIG. 6A.

FIG. 6A is a diagrammatic representation of a state transition diagram for a finite state machine. FIG. 6B is a diagrammatic representation of a PLA circuit implementing the state transition diagram of FIG. 6A. Compared to the PLA circuit of FIG. 5C, the PLA circuit of FIG. 6B is largely the same, except for the location of the via bores, which connect different nodes of the circuit.

Figure 6C:
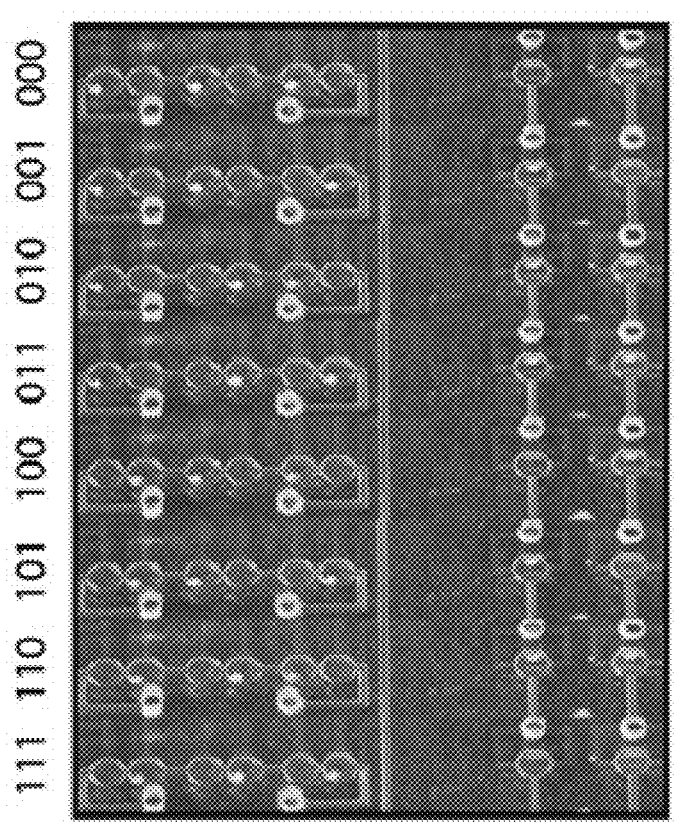
FIG. 6C is a diagrammatic representation of a visual truth table.

FIG. 6C is a diagrammatic representation of a visual truth table, in which the eight acceptable states of the finite state machine implemented by the PLA circuit in FIG. 6C, taking into account the user input, may be verified.

Figure 6D:
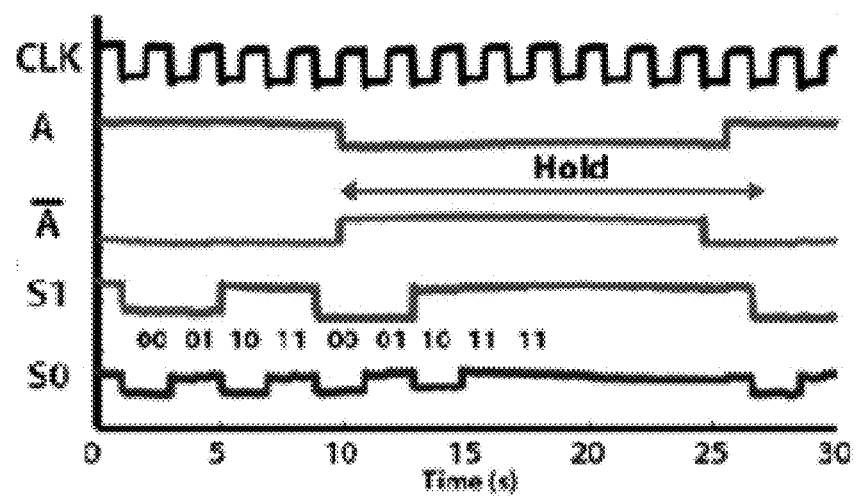
FIG. 6D is a graphical representation of a time trace graph from the circuit of FIGS. 6A-6C.

FIG. 6D is a graphical representation of a time trace graph from the circuit of FIGS. 6A-6C. The time trace is calculated using video analysis and measuring valves opening and closing. FIGS. 6A-6C depict a "count-and-hold" FSM, in which the FSM sequentially iterates through the four states (00, 01, 10, 11), and then when it reaches the last state (11), the FSM holds on the last state as long as the user input (A) is 0. When the user input (A) becomes 1, the FSM moves back to the first state and iterates through the four states again. The time trace of FIG. 6D confirms that the "count-and-hold" FSM is operating correctly.

By using a PLA as the combinatorial logic block for the FSM, it becomes possible to create programmable sequential circuits. The circuit may encode different program sequences by changing the placement of the membrane via holes.

Integration of the pneumatic digital logic with liquid circuits on the same pneumatic device, then, may enable liquid handling control without external controllers. As an example, the FSM circuit may be integrated with liquid handling circuits containing an oscillator pump to create automated liquid handling systems. A 2-bit FSM may control a metering and mixing loop, where advancement through the four states of the FSM is controlled by the user pressing a pneumatic switch on the pneumatic device itself. The switch may be a pneumatic port that draws in air. When the port is covered by the user, the circuit may detect the change in flow. Such a pneumatic device requires no other input except for pneumatic lines providing static vacuum to supply power.

Figure 7:
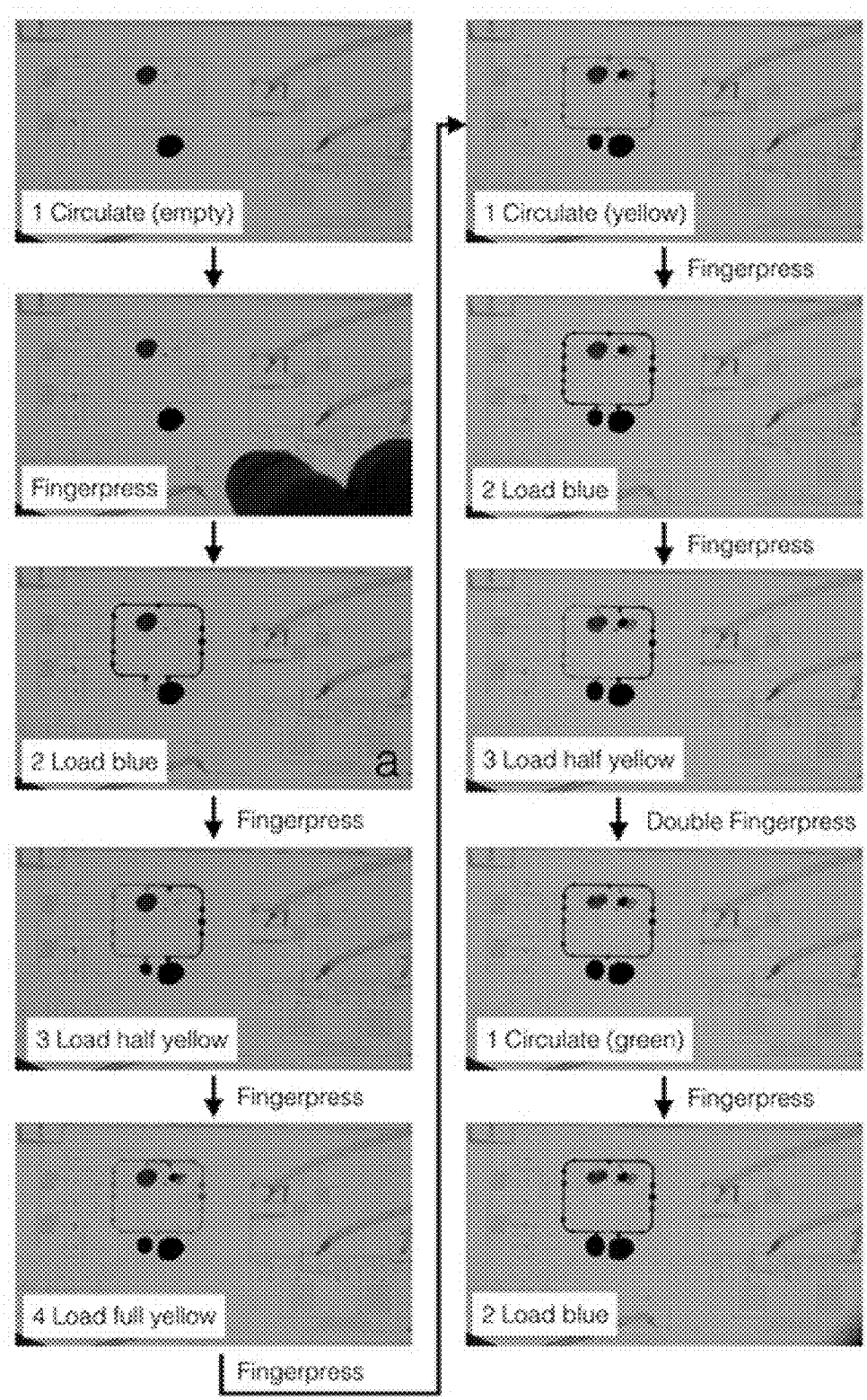
FIG. 7 is a pictorial representation of stages of an automated metering and mixing pneumatic device.

FIG. 7 is a pictorial representation of an automated metering and mixing pneumatic device. Each time the user provides an input via a fingerpress, the device proceeds to the next state. The first state corresponds to the liquid handling system circulating the liquid in the loop. The second state corresponds to the system loading blue liquid into the loop. The third state corresponds to loading half of the loop with yellow liquid. The fourth state corresponds to loading the full loop with yellow liquid. FIG. 7 shows the liquid handling device proceeding through the various states based on the user input to meter and mix two liquids.

Figure 8:
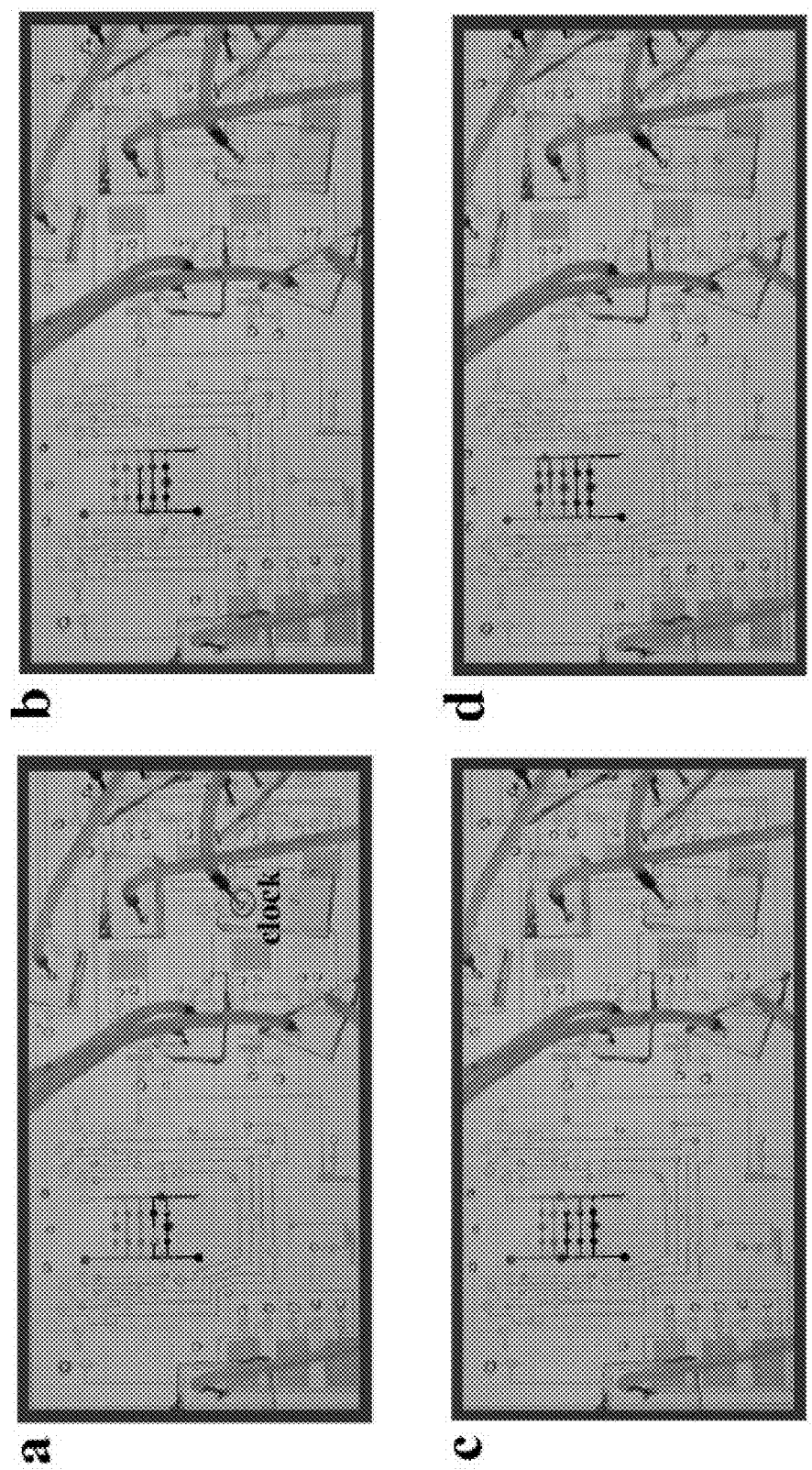
FIG. 8 is a pictorial representation of stages of a pneumatic device implementing a programmable microcontroller directing the operation of a serial dilution ladder.

FIG. 8 is a pictorial representation of a pneumatic device implementing a microcontroller directing the operation of a serial dilution ladder. The FSM of the pneumatic device routes signals from an oscillator pump sequentially through a series of loops arranged in a ladder formation to create a 1:1 dilution series. Each loop may carry out a 1:1 dilution through circulatory mixing by peristaltic pumping. Each loop may be executed to perform a 1:1 dilution sequentially until an array of serially diluted samples is obtained. Each stage of dilution may be stored for further use. The described implementations may utilize the programmable FSM of the pneumatic device to achieve automation of serial dilution.

Implementations of the autonomous serial dilution ladder include four logic blocks: the oscillator, the FSM, the decoder, and the dilution ladder. The decoder decodes the loop selection signal generated by the FSM on the chip and routes the pumping signal appropriately toward the dilution ladder. The oscillator provides an oscillatory signal used for operating the pump valves to mix the fluids, and the FSM provides the loop selection signal used to determine which loop of the dilution ladder to mix. In some implementations, the oscillator pump component includes five inverter logic gates implemented by pneumatic valves and connected in a closed loop. By proceeding through a pre-programmed sequence in the FSM, autonomous serial dilution of a liquid may be achieved.

Figure 9:
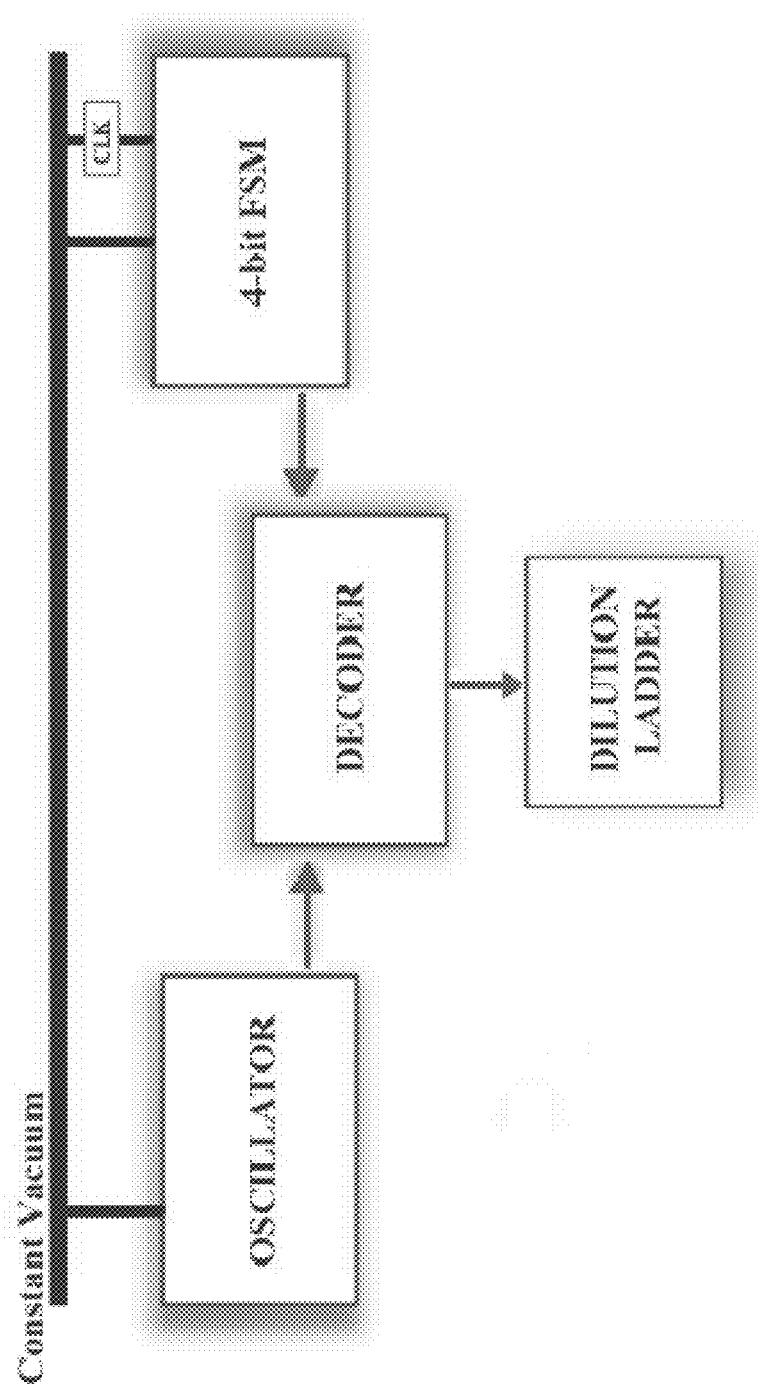
FIG. 9 is a block diagram of an autonomous liquid handling system configured to perform a serial dilution of a liquid.

FIG. 9 is a block diagram of an autonomous liquid handling system configured to perform a serial dilution of a liquid. Operation of this system involves the following: The FSM generates a 4-bit binary code which is fed to the decoder; the decoder decodes the code and selects the corresponding loop of the dilution ladder. Upon selection by the decoder, the path of the oscillatory signal for that particular loop opens up and the oscillatory signal that is generated by the oscillator is routed to the pump valves of that loop. The oscillatory signal establishes circulatory motion of the fluid in the loop and as a result mixes the contents of that loop. In this fashion, all of the loops may be executed in a sequence of the first to the fourth loop and the end results is an array of serially diluted sample.

Returning to FIG. 8, in the first stage of the serial dilution, the first loop is executed to mix the contents of the first loop. In the second stage, the second loop is being executed. In the third stage, the third loop is executed. And in the fourth stage, the fourth loop is executed, resulting in a serially diluted sample.

Although certain of the components and processes are described above in the singular for convenience, it will be appreciated by one of skill in the art that multiple components and repeated processes can also be used to practice the techniques of the described implementations.

While various implementations have been particularly shown and described, it will be understood by those skilled in the art that changes in the form and details of the disclosed embodiments may be made without departing from the spirit or scope of the described implementations. For example, the embodiments described above may be implemented using a variety of materials. Therefore, the scope should be determined with reference to the appended claims.

What is claimed is:

1. A pneumatic device implementing a finite state machine, the pneumatic device comprising:
    a state register component configured to hold one of a set of possible states; and
    a next-state logic block component configured to determine a next state for the state register component based at least in part on a current state of the state register component.

2. The pneumatic device of claim 1, wherein the next state for the state register component is based at least in part on a user input.

3. The pneumatic device of claim 2, the pneumatic device further comprising a pneumatic switch configured to receive the user input.

4. The pneumatic device of claim 1, the pneumatic device composed of an elastomeric membrane disposed between two channel layers, wherein the next-state logic block component comprises a pneumatic programmable logic array comprising a pattern of holes disposed in the elastomeric membrane of the pneumatic device.

5. The pneumatic device of claim 4, the pattern of holes implementing a set of Boolean expressions, the set of Boolean expressions determining one or more state transitions of the finite state machine.

6. The pneumatic device of claim 1, the pneumatic device further comprising a plurality of fluid valves configured to perform fluid handling operations, each fluid handling operation corresponding to a state of the finite state machine.

7. The pneumatic device of claim 6, the fluid handling operations comprising one or more of metering, mixing, agitating, exchanging, and recirculating fluids on the pneumatic device.

8. The pneumatic device of claim 6, the finite state machine configured to actuate the plurality of fluid valves configured to perform serial dilution of a liquid.

9. The pneumatic device of claim 1, the pneumatic device further comprising a visual display comprising a bank of valves configured to open and close to show the current state of the state register component.

10. The pneumatic device of claim 1, the pneumatic device receiving from a system clock a system clock signal oscillating between binary 1 and 0 at a set frequency, wherein binary 1 is represented by vacuum pressure and binary 0 is represented by atmospheric pressure.

11. The pneumatic device of claim 10, wherein the system clock is located on the pneumatic device comprising a hardwired circuit of logic gates implementing one or more Boolean expressions.

12. The pneumatic device of claim 1, wherein the finite state machine is a nonprogrammable finite state machine.

13. The pneumatic device of claim 1, the state register comprising one or more pneumatic D flip-flop circuits.

14. The pneumatic device of claim 13, wherein each pneumatic D flip-flop circuit comprises two cascaded D latches gated by a system clock of the pneumatic device.

15. A pneumatic programmable logic array implementing a next state logic block of a finite state machine, the pneumatic programmable logic array comprising:
    an elastomeric membrane disposed between two channel layers of a pneumatic device, the elastomeric membrane including a pattern of holes disposed in the elastomeric membrane;
    wherein the programmable logic array receives one or more input values representing a current state of a state register and a user input; and
    wherein the programmable logic array calculates one or more output values representing a next state for the state register.

16. The pneumatic programmable logic array of claim 15, wherein the programmable logic array receives one or more input values from one or more sensors.

17. The pneumatic programmable logic array of claim 15, the pattern of holes implementing a set of Boolean expressions, the set of Boolean expressions determining one or more state transitions for a programmable finite state machine.

18. The pneumatic programmable logic array of claim 15, wherein each hole disposed in the elastomeric membrane is configured to form a circuit connection between the two channel layers of the pneumatic device.

19. The pneumatic programmable logic array of claim 15, wherein the current state of the state register corresponds to a first fluid handling operation performed by the pneumatic device, and wherein the next state of the state register corresponds to a second fluid handling operation performed by the pneumatic device.

* * * * *